Oct. 20, 1970    F. ASSMUS ET AL    3,534,543
ELECTRIC SIGNALING DEVICE FOR ALARM CLOCKS
Filed Oct. 4, 1967    6 Sheets-Sheet 2
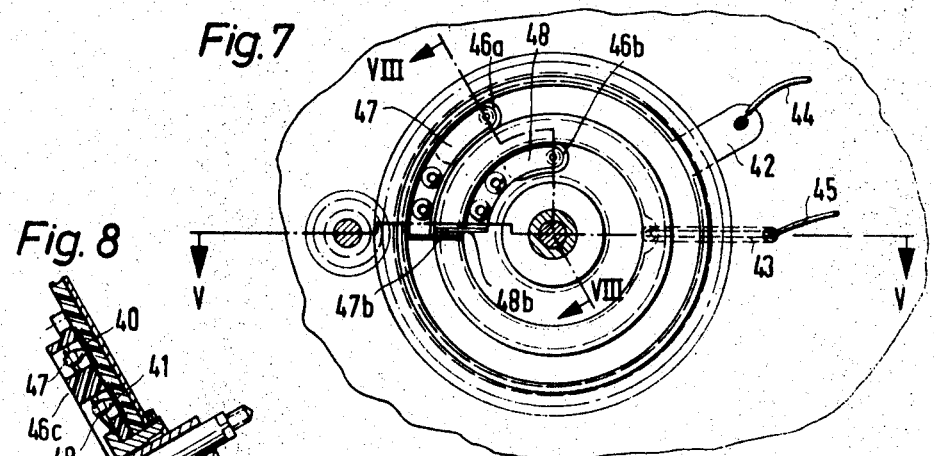
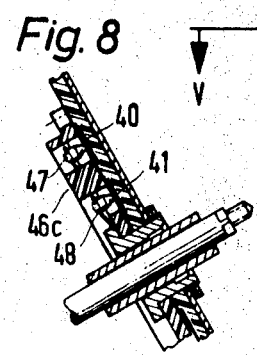
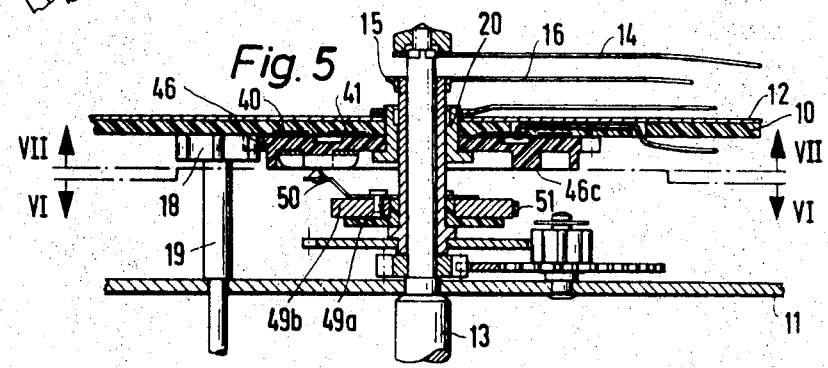
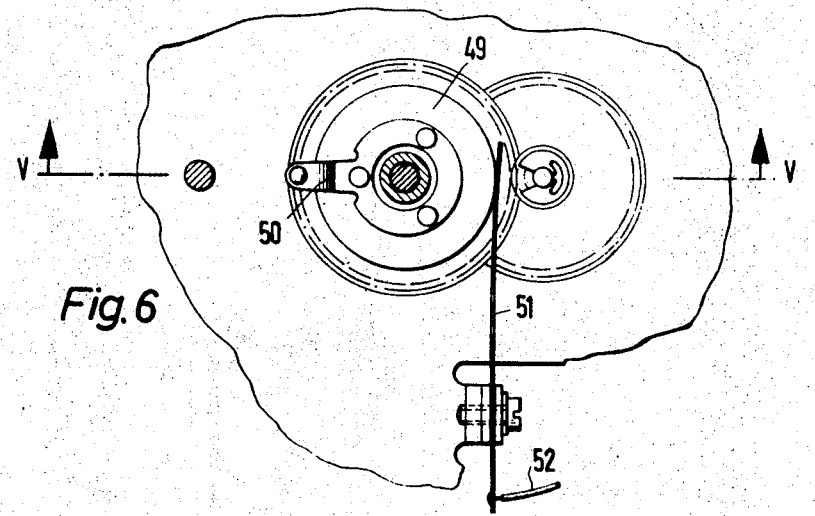
INVENTORS
F. Assmus
H. Flaig
BY D. Dietrich
L. Hartner
Waters, Cole, Grindle & Waters Attys.

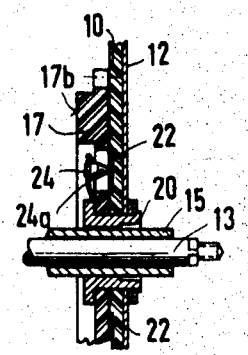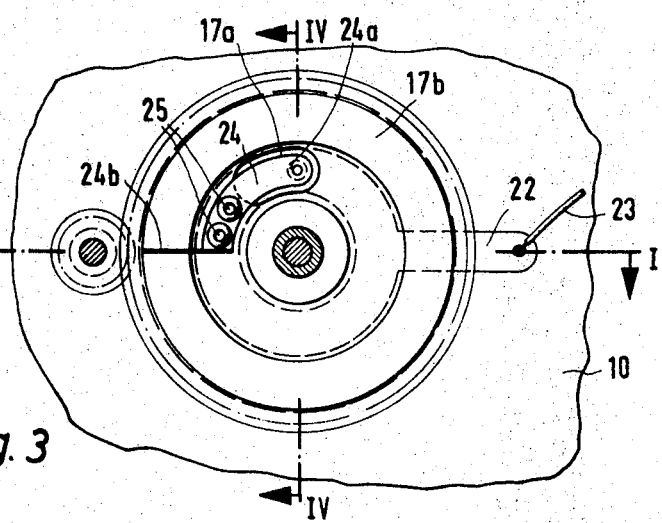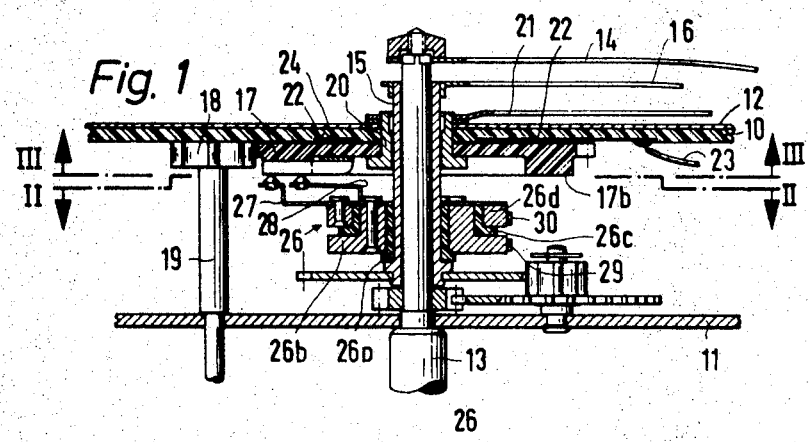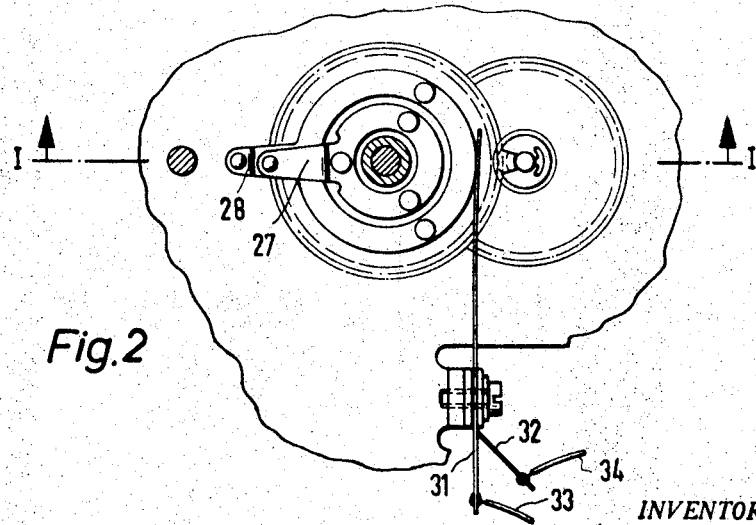

Fig. 9 Fig. 10 Fig. 11
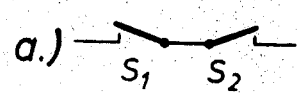
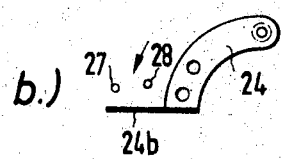
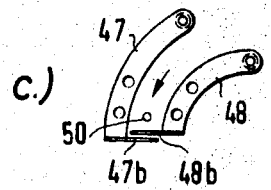
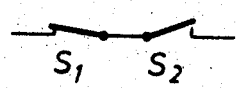
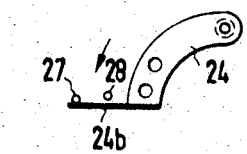
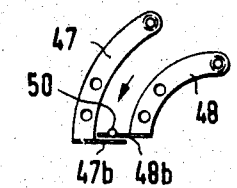
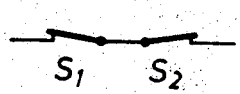
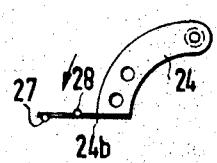
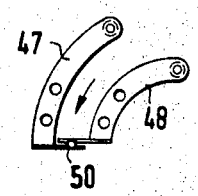
Fig. 12 Fig. 13
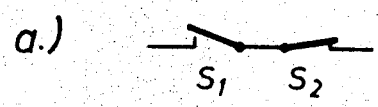
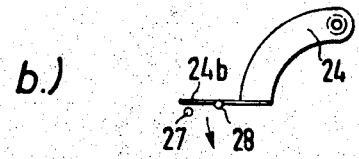
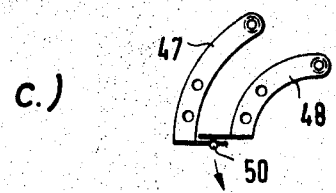
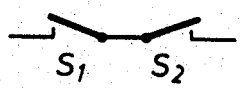
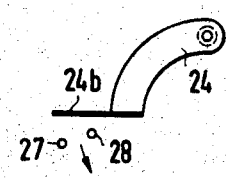
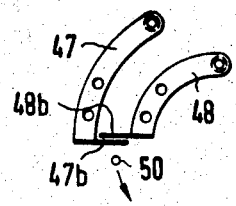

Oct. 20, 1970   F. ASSMUS ET AL   3,534,543
ELECTRIC SIGNALING DEVICE FOR ALARM CLOCKS
Filed Oct. 4, 1967   6 Sheets-Sheet 4

INVENTORS
F. Assmus
BY H. Flaig
D. Dietrich
L. Hartner
Watson Cole Grindle & Watson Attys.

United States Patent Office 3,534,543
Patented Oct. 20, 1970

3,534,543
ELECTRIC SIGNALING DEVICE
FOR ALARM CLOCKS
Friedrich Assmus and Hans Flaig, Schramberg-Sulgen, Wurttemberg, Dieter Dietrich, Lauterbach, Wurttemberg, and Leo Hartner, Aichhalden, Wurttemberg, Germany, assignors to Gebruder Junghans G.m.b.H., Schramberg, Wurttemberg, Germany, a corporation of Germany
Filed Oct. 4, 1967, Ser. No. 672,819
Claims priority, application Germany, Oct. 5, 1966, J 31,931
Int. Cl. G04b 23/10
U.S. Cl. 58—21.12                          2 Claims

ABSTRACT OF THE DISCLOSURE

An electric signaling device for battery alarm clocks having a switching device with a double contact and a common contact element and two separate contact elements cooperating with the common contact element. The separate contact elements are arranged in stepped relation and the contacts being operable by the clock movement.

---

This invention relates to an electric signaling device for alarm clocks, particularly for battery operated alarm clocks, with a switching device to be operated by the movement of the clock.

The invention provides an electric signaling arrangement for alarm clocks, which, while being of a simple structure, will guarantee a safe and sure method of operation and which, after operation of a signal transmitter, will be ready for operation again within a short period of time. According to the invention, the switching arrangement, operated by the movement of the clock, has been developed as a double contact with one common contact element and two separate contact elements cooperating with said first element, and in that the separate contact elements have been arranged in staggered relationship between the separated contact elements and the contact elements in common in relation to the relative movement produced by the movement of the clock so as to come in contact with the common contact element one after the other. Preferably, the contact path which is closed first is connected with a transmitter of a warning signal and the second contact path is connected with a transmitter of a primary signal. At the same time, the transmitter of the warning signal can be of any desired type, preferably, however, one will use an electronic transmitter for the warning signal, resulting in a simple structure with the double contact in the case of a comprehensive method of operation.

Figure 15:
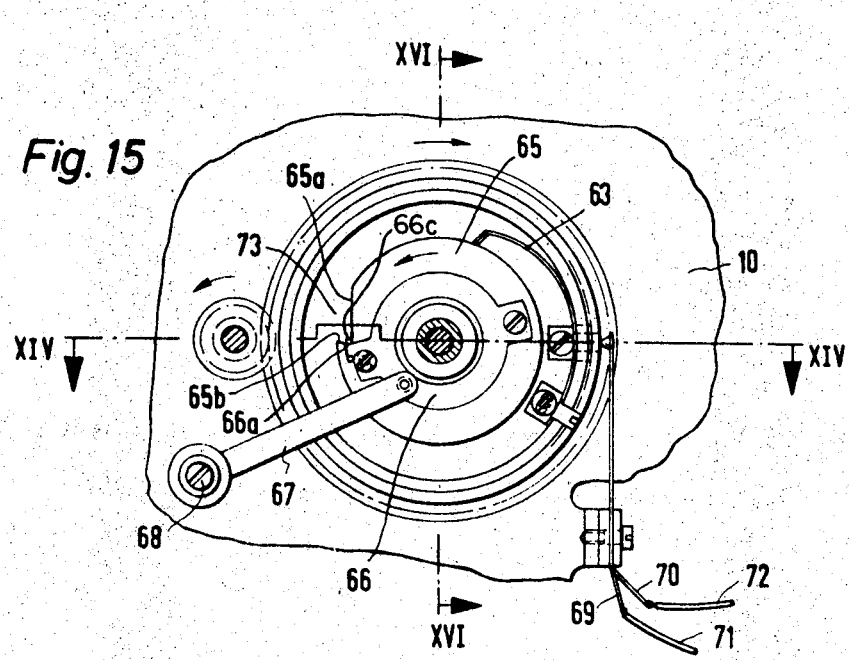
Figure 14:
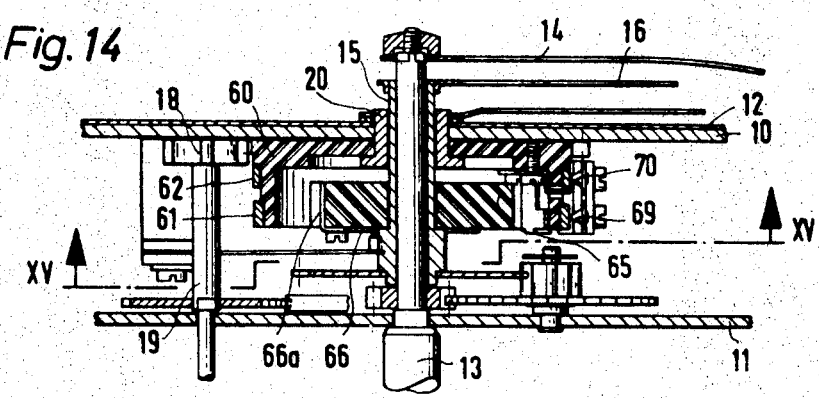
Figure 16:
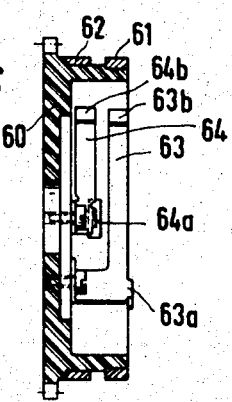
Figure 17:
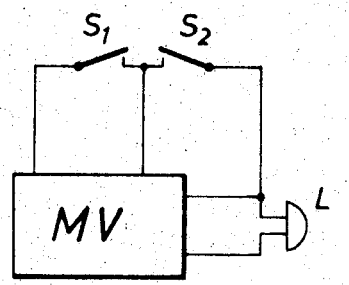
Figure 18:
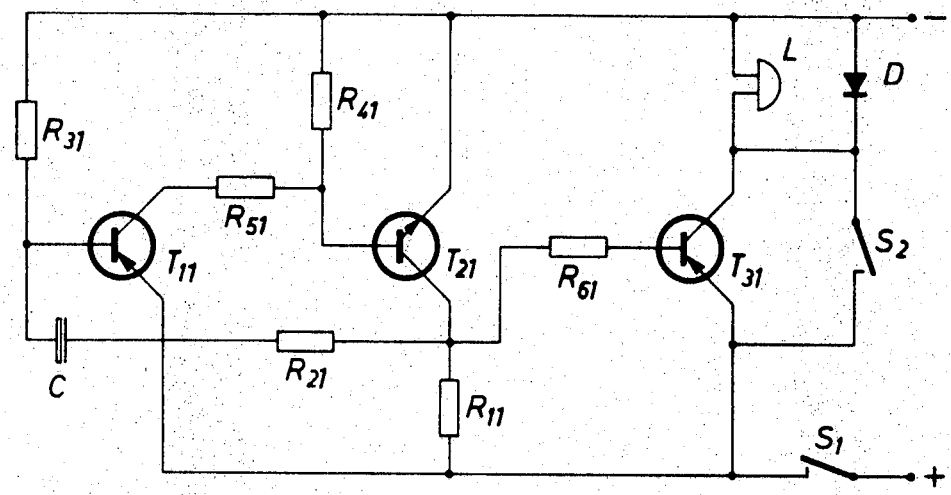
Figure 19:
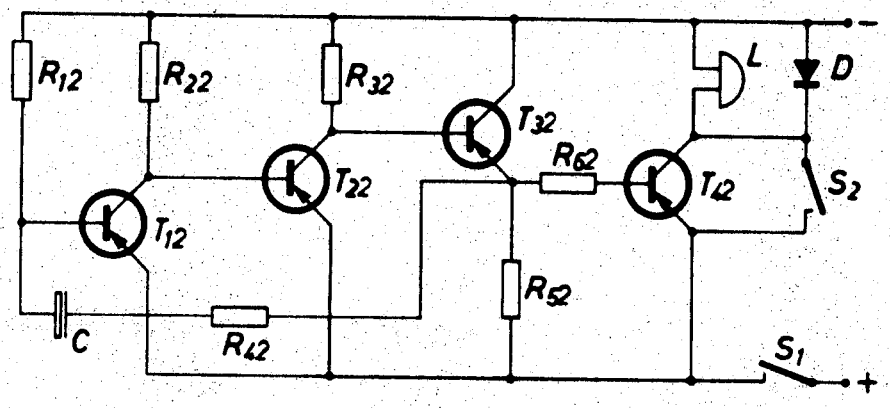
Figure 20:
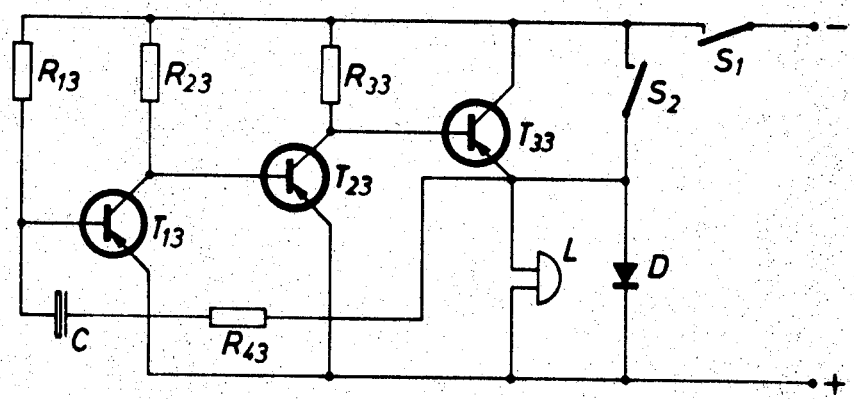
Figure 21:
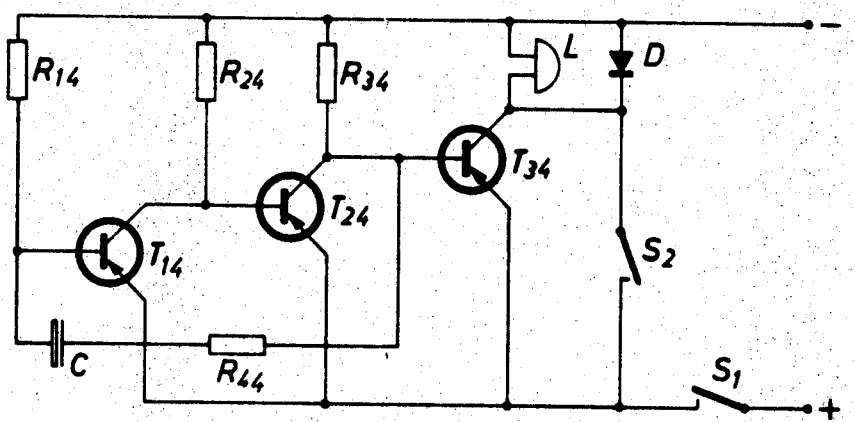

Further objects will be apparent from the following description when considered in connection with the accompanying drawings in which:

FIG. 1 is a cross section of a portion of an alarm clock taken on lines I—I of FIGS. 2 and 3, FIG. 2 is a sectional view taken on line II—II of FIG. 1, FIG. 3 is a sectional view taken on line III—III of FIG. 1, FIG. 4 is a sectional view of a detail taken on line IV—IV of FIG. 3, FIG. 5 is a cross section of a modified construction of a single rotary contact taken on lines V—V of FIGS. 6 and 7, FIG. 6 is a sectional view taken on line VI—VI of FIG. 5, FIG. 7 is a sectional view taken on line VII—VII of FIG. 5, FIG. 8 is a sectional view of a detail taken on line VIII—VIII of FIG. 7, FIGS. 9a to 13c are diagrammatic views illustrating the contacts in different operating positions, FIG. 14 is a cross section of a further modified construction of a portion of an alarm clock taken on line XIV—XIV of FIG. 15, FIG. 15 is a sectional view taken on line XV—XV of FIG. 14, FIG. 16 is a cross section of an adjusting wheel, FIG. 17 illustrates an application of the apparatus, FIG. 18 is a wiring diagram of an electronic multivibrator circuit, and FIGS. 19 to 21 are wiring diagrams showing various electronic multivibrator circuits.

The plate number 10 in FIGS. 1 to 4, consisting of an insulating material, supports the dial 12. 11 designates a second plate member or frame. In plates 10 and 11, a minute shaft 13, carrying the hand 14, has been mounted. The hour sleeve or tube 15 carrying the hand 16 is mounted on the minute shaft 13, the hour sleeve in turn being encompassed by a bushing 20 carrying the hand 21 for the setting of the alarm. This bushing 20 has been mounted rotatably and in frictional engagement with the plate member 10. On the side facing away from the dial 12 there is provided the adjusting wheel 17 for the alarm, which is adjustable with the aid of a pinion 18 on a shaft 19.

On the side of the plate member 10 made of nonconductive material and facing away from the dial 12, there is provided a contact ring 22 made of electrically conductive material, with which a line or wire 23 has been connected.

The adjusting wheel 17 of the alarm has been provided with an outside or peripheral rim 17b and has in its center part a cavity, in which a contact spring 24 has been fastened with the aid of rivets 25. In the adjusting wheel 17, a perforation 17a has been provided, which is within the area of the contact ring 22. The contact point of the spring contact 24 protrudes through the perforation 17a and slides on the contact ring 22. The rear end 24b of the contact spring 24 has been bent at a right angle and this end penetrates through a slot in the fortified edge 17b of the adjusting wheel 17 of the alarm to form a contact strip, which can be brought into electric contact with a contact sliding on the edge 17b.

On the hour sleeve or tube 15, a wheel 26 is fastened by means of an insulating bushing 26a, which consists of the ring elements 26b and 26d, which are electrically conductive and have been separated electrically one from the other by an additional insulating bushing 26c. The contact spring lamellae 28 and 27 are connected with the two electrically conductive ring elements 26b and 26d, which lamellae rest or contact on the edge 17b of the adjusting wheel 17 of the alarm. The two contracts 27 and 28 have been staggered in relation to one another somewhat in the direction of travel of the wheel 26, so that they will not come in contact with the contact strip 24b simultaneously. The method of operation will be explained hereinafter with reference to FIGS. 9 to 13.

The slip rings 29 and 30, on which two contact springs 31 and 32 slide and which are connected to wires 33 and 34 arranged on the outside periphery of the wheel 26, are associated with the contacts 27 and 28, respectively.

It is also possible to use, instead of the contact ring 22 in a plate member 10 of a nonconductive material, a plate of an electrically conductive material on which the contact 24a will slide directly. However, in that case the movement of the clock will be under tension.

FIGS. 5 to 8 show a modified design by way of example, with only one rotating contact. The same parts in this case have been given the same reference numbers for corresponding parts. In this case, two concentrically located contact rings 40 and 41 are provided in the plate 10, made of nonconductive material, and are provided with electrical connectors (not shown). The adjusting wheel 46 of the alarm has been arranged on the bushing 20, which in this case has been developed with a protruding edge 46c, FIG. 8. Perforations 46a and 46b have been provided in two annular grooves of the adjusting wheel 46 of the alarm, through which spring contacts 47 and 48 project. These two contact springs 47 and 48 are in electrically conductive contact with the contact rings 40 and 41.

The ends 47b and 48b of the contact springs 47 and 48, respectively, are bent at right angles and penetrate through the projecting edge 46c. Ends 47b and 48b are separated by a small distance as shown in FIG. 7.

A disk 49b is mounted on the hour tube or sleeve 15, with the aid of an insulating bushing 49a, and carries a spring contact 50. This spring contact 50 glides on the protruding edge 46c of the adjusting wheel 46. The contact lamella 50 is electrically conductively connected with the electrically conductive disk 49b. A contact spring 51 slides on the periphery of the disk 49b and is provided with wire 52.

The method of operation of the structure according to FIGS. 1 to 8, given by way of example, will be explained in more detail in the following paragraphs on the basis of FIGS. 9 to 13. FIGS. 9a–13a illustrated operative positions of the two contacts; FIGS. 9b–13b illustrate contacts according to the structure of FIGS. 1 to 4; and FIGS. 9c–13c illustrates the contacts according to the structure of FIGS. 5 to 8.

FIGS. 9a–c show the position of the contacts shortly before reaching the time for sending out the alarm. Both contact paths $S_1$ and $S_2$ in this case are open.

In FIGS. 10a–c the first contact has been closed in the direction of movement of the contact, while the second contact has not reached the contact strip or the contact strips as yet. The contact path $S_2$ therefore is still open.

In FIGS. 11a–c both contacts are in contact with the switching strip or switching strips, that is, both contact paths $S_1$ and $S_2$ are closed.

FIGS. 12a–c show the position in which the first contact in the direction of movement, is opened. In FIG. 12b the first contact in the direction of movement has left the contact strip 24b, while the following contact 28 is still located on the contact strip 24b. FIG. 12c the rotating contact 50 has left the first contact strip and is still only located on the second contact strip 47b. Consequently, the contact path $S_1$ is open, while the contact path $S_2$ is still closed.

FIG. 13a shows a position in which the two contact paths $S_1$ and $S_2$ are again open and thus the signaling device has been completely switched off. In FIG. 13b both contacts 27 and 28 have left contact strip 24b and in FIG. 13 contact 50 has left both contact strips 47b and 48b.

In FIGS. 14 to 16, a third embodiment is illustrated. In this embodiment the adjusting wheel 60 is mounted to the housing 20, and the adjusting wheel is partially in the shape of a hollow cylinder. Two contact springs 63 and 64 are mounted within the hollow cylindrical part with their respective contact ends 63b and 64b pointing approximately in the direction of the middle axis of the adjusting wheel 60. The contact springs 63 and 64 are connected by declinated flanges 63a and 64a with slip rings 61 and 62 arranged on the outside periphery of the adjusting wheel 60, on which slip rings two contact springs 69 and 70 slide, which are provided with wires 71 and 72.

A disk 65 made of insulating material is placed on the hour cylinder or sleeve 15, which rotates together with the hour hand. Disk 65 carries a slip ring 66 on one of its front sides, on which slides a contact spring 67 which leads to a solid connector 68. The contact ring 66 has been provided with a projecting flange 66a, which has been bent at right angles and which is located in the base of a notch 73 in the disk 65. This notch includes an edge 65b running approximately radially and preferably being undercut, and with an edge 65a which runs approximately perpendicularly thereto. The bent flange 66a of the slip ring 66 also preferably has an essentially radially running edge 66c, which preferably is likewise undercut. The direction of movement of the disk 65 has been indicated by an arrow. Because of the special development of the notch 73, the contact points 63b and 64b, upon reaching the edge 65b, will suddenly drop into notch 73, so that an instantaneous contact takes place with projecting flange 66a. Also, disengagement of the contact points is accomplished momentarily in a similar manner. Otherwise the method of operation is the same as in the case of the structure illustrated by way of example in FIGS. 1 to 8.

In FIG. 17 the method of operation of the device according to the invention has been shown schematically. MV is a warning signal transmitter, which may be of any desired kind. One uses preferably as a warning signal transmitter, an electric transmitter which, for practical purposes, is developed as a transistor-multivibrator. An alarm bell L, for example, has been connected to this alarm signal transmitter MV. Instead of an alarm bell, any other acoustic or an optic signal transmitter, for example, an electric bulb or lamp, can be used. $S_1$ and $S_2$ are the contact members opened and closed through the previously described contact arrangement. If the contact path $S_1$ is closed, then the alarm signal transmitter MV is placed into operation, as a result of which, for example, the signal transmitter L is fed by impulses. If subsequently the contact path $S_2$ is closed, then the alarm signal transmitter MV is shorted, so that now the signal transmitter L is fed continuously and thus it transmits a constant signal.

In FIGS. 18 to 21, various electronic multivibrator circuits are shown, which can be used, for example, as alarm signal transmitters MV in FIG. 17.

FIG. 18 shows a multivibrator circuit using complementary transistors $T_{11}$ and $T_{21}$. The subsequently added power transistor $T_{31}$ in this case serves to drive the load.

During the pulse pause, in this case, the two transistors $T_{11}$ and $T_{21}$ are blocked. $T_{11}$ will remain blocked until the condenser C will be charged by the resistances $R_{11}$, $R_{21}$ and $R_{31}$ to such a point that the threshold voltage of the base-emitter path of transistor $T_{11}$ has been reached. First of all a small base current will flow, which is fed, after having been increased by the increase of this transistor, to the transistor $T_{21}$ as a control current. The transistor $T_{21}$ thereupon becomes conductive and the through-connection of transistor $T_{11}$ will be accelerated by the feedback through the resistance $R_{21}$ and the condenser C. Thereupon the transistors $T_{11}$ and $T_{21}$ are opened. The condenser C is then recharged by the base-emitter path of the transistor $T_{11}$ until it falls short of the threshold voltage of the transisor $T_{11}$ and the multivibrator tips back into the starting state. The method of operation of the multivibrator is started as soon as the contact path $S_1$ is closed. The transistor $T_{31}$ is switched according to the switching state of the transistor $T_{21}$, the signal transmitter L being switched in the collector path of said transistor $T_{31}$, which transmitter is thus fed by means of the current pulses created by the transistor $T_{31}$. The RC element from the condenser C and the resistances $R_{31}$ and $R_{21}$ determine, respectively, the duration time of the pause and the transmission time of the impulse.

If the contact member $S_2$ is closed, then the transistor $T_{31}$ is bridged and the signal transmitter L is fed directly from the source of DC current, for example, from a battery.

D is a diode connected in parallel to the signal transmitter L, for example, an alarm bell, through which diode surges occurring during the operation are supposed to be suppressed.

A multivibrator circuit is shown in FIG. 19 which uses only transistors which are of the same type conductivity. In the present case, p-n-p transistors have been used which, in comparison with n-p-n transistors, are considerably less expensive. For that reason one will have to put up with a somewhat lower degree of effectiveness, which in this case is of no particular importance.

The actual multivibrator is formed by the transistors $T_{12}$, $T_{22}$ and $T_{32}$. Another transistor $T_{42}$ has been provided here for the adaptation of power.

During the pulse pause, transistors $T_{12}$, $T_{32}$ and $T_{42}$ are blocked, while transistor $T_{22}$ is opened. Transistor $T_{12}$ remains blocked until condenser C has been charged by resistances $R_{12}$, $R_{42}$ and $R_{32}$ to the point where the threshold voltage of the base-emitter path of transistor $T_{12}$ has been reached. First of all a small base current, which allows the collector-emitter path of transistor $T_{12}$ to become permeable, will close. The transistor $T_{22}$ thus receives a smaller negative base-emitter voltage, as a result of which its collector-emitter path becomes less conductive and the basis of transistor $T_{32}$ will be at a negative potential, so that the transistor $T_{32}$ will be turned on. The through-connection of the transistors will be accelerated by the feedback $R_{42}$, C. After that, the transistors $T_{12}$ and $T_{32}$ are opened, while $T_{22}$ is blocked. The base of the transistor $T_{42}$ is controlled by the opened collector-emitter path of the transistor $T_{32}$, so that this transistor too is opened and feeds the signal transmitter L located in its output circuit.

The condenser C is recharged by the base-emitter path of the transistor $T_{12}$ and by resistance $R_{42}$, and the opened collector-emitter path of the transistor $T_{32}$, until it falls below the threshold voltage of transistor $T_{12}$, as a result of which the transistors change their switching state and the circuit tips back into its starting state, in which the current is broken by the signal transmitter L.

In the case of the modification given by way of example according to FIG. 20, the previously used adaptation of the transistor has been omitted. This is not possible without any difficulties in the case of the customary multivibrators, since, by switching on and off the signal transmitter L of an alarm bell, for example, through the interrupter contact, the impulses created are superimposed on the multivibrator impulses. In the case of the present circuit, this disadvantage does not have any disturbing effect. In this case the signal transmitter L has been switched in between the positive pole of the source of voltage and the emitter of transistor $T_{33}$.

Since during the pulse pause the interrupter contact of the alarm bell L is closed, the condenser C can be charged by the resistance $R_{13}$ and $R_{43}$ as well as by the winding of the alarm system. In the case of recharging via the base-emitter path of the transistor $T_{13}$ and the resistance $R_{43}$ and the opened collector-emitter path of $T_{33}$, it will then be unimportant if the interrupter contact of the alarm system L is opened or closed during the time that the bell rings.

The switching arrangement according to FIG. 21 has been further simplified in that the feedback is accomplished directly from the collector of the transistor $T_{24}$ by the resistance $R_{44}$ and the condenser C to the base of the transistor $T_{14}$ and in that the alarm system L is now located within the collector branch of the transistor $T_{34}$. As a result thereof, the above mentioned disadvantage of the superimposition of impulse is eliminated.

In this case too, just as in the remaining circuits, a diode D has been provided in parallel to the alarm system L, which serves for quenching the sparks and which thus prevents the occurrence of surges during the opening of the circuit containing the magnetic coil.

I claim:
1. An electric switching device for alarm clocks, comprising;
   first switch contact means,
   second switch contact means,
   said first and second switch contact means are mounted in parallel spaced relationship to each other so that said first switch contact means rotates with respect to said second switch contact means,
   said first switch means including at least one switch contact element extending perpendicular to the plane of rotation of said first switch contact means,
   said second switch contact means including at least one spring contact member extending perpendicular to the plane of rotation of said first and second switch contact means, and
   said first and said second switch contact elements having a narrow cross-section so as to contact one another to provide two momentary successive contacts with the relative rotation of said first and second switch contact means,
   an alarm adjusting wheel which is in the form of a hollow cylinder and a wheel mounted in parallel spaced relationship with said adjusting wheel and in engagement with the driving mechanism of said clock, said wheel being mounted within the hollow portion of said cylinder,
   said first switch contact elements including a pair of resilient contact members mounted to said adjusting wheel and extending parallel to each other in a radial direction,
   said wheel including a cammed notch,
   said cammed notch including a radially running edge having a bent flange,
   said wheel further including a spring contact member projecting into the base of said notch and a contact ring having an essentially radially running and undercut edge which is positioned to be in engagement with said bent flange as said wheel rotates whereby said pair of resilient contact members successively momentarily engage said contact ring.
2. A switching device according to claim 1 wherein said adjusting wheel includes a pair of electrically separated slip rings each respectively connected to one of said resilient contact members, and a pair of spring contact elements each one of said pair of spring contact elements being in contact with a respective one of said slip rings.

References Cited

UNITED STATES PATENTS

| | | | |
|---|---|---|---|
| 2,651,166 | 9/1953 | Dorfman | 58—19 |
| 2,709,331 | 5/1955 | Lehner | 58—19 |

FOREIGN PATENTS

| | | |
|---|---|---|
| 1,483,896 | 6/1967 | France. |

RICHARD B. WILKINSON, Primary Examiner

L. R. FRANKLIN, Assistant Examiner